United States Patent
Huh et al.

(10) Patent No.: US 6,791,976 B2
(45) Date of Patent: Sep. 14, 2004

(54) MOBILE-TO-MOBILE DTMF SIGNALING IN TANDEM FREE OPERATION

(75) Inventors: Young U. Huh, Naperville, IL (US); Mahmoud R. Sherif, Whippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 818 days.

(21) Appl. No.: 09/738,702

(22) Filed: Dec. 15, 2000

(65) Prior Publication Data

US 2002/0027930 A1 Mar. 7, 2002

Related U.S. Application Data

(60) Provisional application No. 60/173,351, filed on Dec. 28, 1999.

(51) Int. Cl.[7] .............................................. H04L 12/66
(52) U.S. Cl. ...................... 370/356; 370/467; 370/522; 379/142.18
(58) Field of Search ................................. 370/335, 356, 370/441, 236, 338, 522, 467, 442, 310; 379/142.18, 283; 704/200, 212, 221

(56) References Cited

FOREIGN PATENT DOCUMENTS

| FR | ETSI TS 101 732 | 7/1999 | |
|---|---|---|---|
| JP | 000496684 | 8/1994 | ............ H04Q/7/30 |
| WO | WO 98/27758 | 6/1998 | |

*Primary Examiner*—Duc Ho

(57) ABSTRACT

A wireless communication method and arrangement that facilitates and allows a user at one end to send dual tone multiple frequency characters from one wireless unit to a second wireless unit completely within tandem free operation mode without changing to tandem operation mode. By remaining in tandem free operating mode during dual tone multiple frequency signaling the delay and distortion of the CODECs used in tandem operation mode is avoided, and the real possibility of missing bursts of dual frequency multiple frequency characters that exists presently because of existing timing requirements is removed.

20 Claims, 4 Drawing Sheets

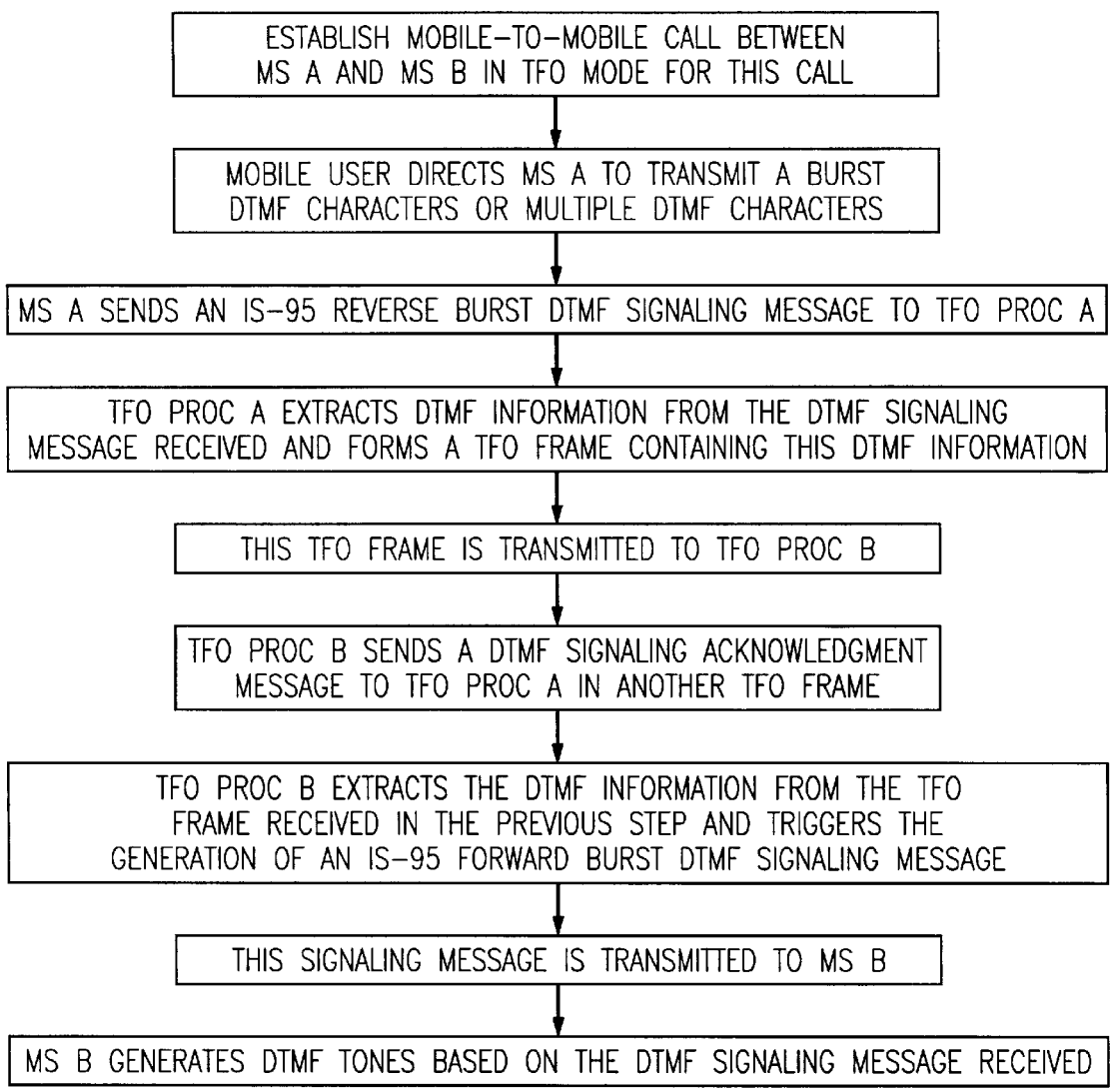

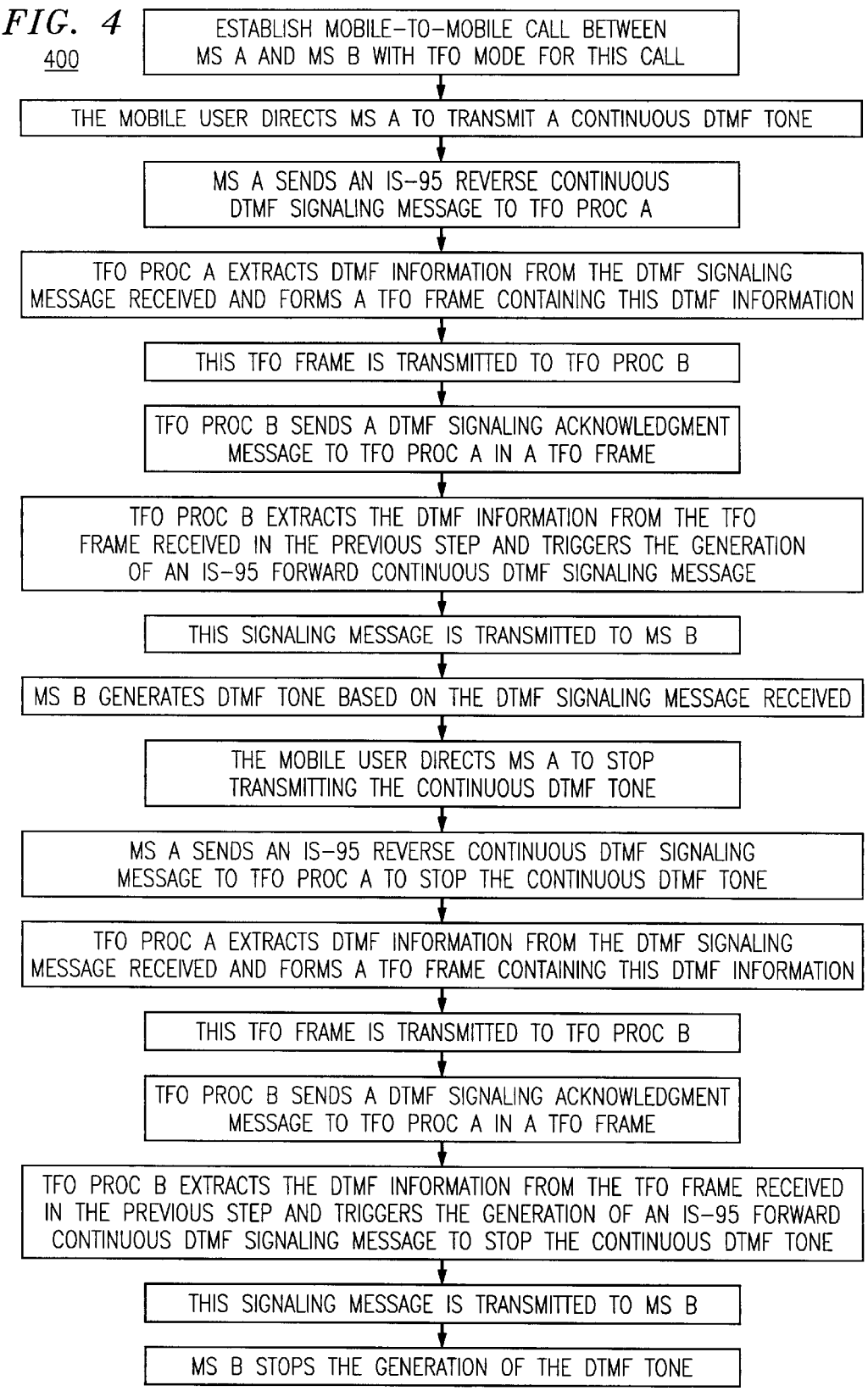

MOBILE-TO-MOBILE DTMF SIGNALING IN TANDEM FREE OPERATION

CROSS REFERENCE TO RELATED APPLICATION

This application claims priority of Provisional Application Ser. No. 60/173,351, which was filed on Dec. 28, 1999.

TECHNICAL FIELD

The invention relates to mobile telephone stations and more particularly for a method and apparatus for dual tone multiple frequency (DTMF) signaling between mobile stations in a tandem free operation (TFO) mode without switching to a tandem operation mode.

BACKGROUND

The known operation of mobile-to-mobile communication arrangement 100 is shown in FIG. 1 and is referred to as tandem operation. In tandem operation, if mobile station A (MS A) 102 attempts to send a DTMF signal to mobile station B (MS B) 124, then MS A 102 encodes a message with the DTMF signal according to the IS-95 standards and sends the message over the air. The encoded DTMF signal is received by coder/decoder (CODEC) A 108, decoded by CODEC A 108, and sent over a high bit rate line 112 to CODEC B 118. CODEC B encodes the DTMF signal and sends it to MS B 124. MS B 124 decodes the encoded DTMF signal and uses it. CODEC A 108 and CODEC B 118 know the format of their respective mobile stations and will provide any protocol or format conversion that is necessary, such as CDMA to TDMA. If both MS A 102 and MS B 124 use CDMA, i.e. are both digital, then CODEC A 108 and CODEC B 118 are not adding anything by their operation except some quantization noise, distortion and some time delay. The distortion and the delay are reasons that bypass or tandem free operation (TFO) mode standards are open for suggestions in area.

The presently proposed TFO standards do not include a way to provide mobile-to-mobile DTMF signaling without first switching into tandem operating mode and go through CODECs. The IS-95 standards for CDMA provide for Reverse (Uplink) DTMF Signaling Messages and Forward (Downlink) DTMF Signaling Messages; however, there is presently no end to end DTMF signaling mechanism in the proposed TFO mode. Because the TFO standards are presently without a DTMF signaling mechanism in TFO mode, it is presently necessary to go into tandem operation mode (i.e., without TFO) and use CODECs whenever DTMF signaling is needed.

According to the presently proposed TFO standards, going out of TFO mode could require about 60 msec. According to the BellCore standards for DTMF detection, a DTMF energy burst of a duration of 40 msec or more should be detected successfully by the station to which it is directed. Thus, it can be seen that a waiting period of 60 msec could very well cause a DTMF character and/or digit not to be detected at the receiving mobile station.

Further, wireless local loop (WLL) applications are becoming a very vital part of the wireless applications and products. Often in WLL, a Network Interface Unit (NIU) is used as the mobile. End-users can hook up ordinary, off-the-shelf landline equipment (e.g., answering machines, POTS phone sets, etc.) to their NIUs. Therefore it is important to ensure the reliable transmission of DTMF tones from one mobile (e.g. MS A 102) to another mobile (e.g. MS B 124), especially when MS B 124 is a NIU, and to be able to reliably use any of the NIU peripherals (e.g., answering machines) through the use of signaling by way of DTMF tones.

Thus, there is a need in the art for TFO with reliable DTMF signaling.

There is also a need in the art for mobile to mobile operation without needless distortion and delay caused by unnecessary coding and decoding by CODECs.

SUMMARY OF THE INVENTION

This proposal makes it possible to support mobile station-to-mobile station DTMF signaling in TFO mode, without having to switch into tandem operation mode when the mobile stations use compatible wireless digital communication techniques.

In accordance with one aspect of the invention, the aforementioned problems are addressed and an advance in the art achieved by providing a method for sending a DTMF tone burst from a first MS to a second MS while a call is in progress. This method includes the steps of: establishing a TFO mode for this call; directing the first MS to transmit a DTMF tone burst representing at least one DTMF character; sending an IS-95 reverse burst DTMF signaling message from the first MS to a first TFO processor; extracting DTMF information from the burst DTMF signaling message received by the first TFO processor and forming a TFO frame containing this DTMF information; and transmitting this TFO frame to a second TFO processor. Upon receiving the DTMF information in the TFO frame, the method continues with the steps of: sending a DTMF signaling acknowledgment message from the second TFO PROC to the first TFO PROC in another TFO frame; extracting the DTMF information from the TFO frame received by the second TFO PROC and triggering the generation of an IS-95 forward burst DTMF signaling message; transmitting this forward burst DTMF signaling message to the second MS; and generating DTMF tones based on the DTMF information of the DTMF signaling message received by the second MS.

In accordance with another aspect of the invention, the aforementioned problems are addressed and an advance in the art achieved by providing a method for sending a continuous DTMF tone from a first MS to a second MS while a call is in progress. This method includes the steps of: establishing TFO mode for this call; directing the first MS to transmit a continuous DTMF tone representing at least one DTMF character; sending an IS-95 reverse burst DTMF signaling message from the first MS to a first TFO processor; extracting DTMF information from the continuous DTMF signaling message received by the first TFO PROC and forming a TFO frame containing this DTMF information; and transmitting this TFO frame to a second TFO PROC. Upon receiving the DTMF information in the TFO frame, the method continues with the steps of: sending a DTMF signaling acknowledgment message from the second TFO PROC to the first TFO PROC in another TFO frame; extracting the DTMF information from the TFO frame received by the second TFO PROC and triggering the generation of an IS-95 forward burst DTMF signaling message; transmitting this forward burst DTMF signaling message to the second MS; and generating DTMF tones based on the DTMF information of the DTMF signaling message received by the second MS.

In accordance with another aspect of the invention, the aforementioned shortcomings of the art are addressed and an advance in the art provided by an apparatus for sending a burst of DTMF tones from one mobile station to another mobile station while a call is in progress. The apparatus includes: TFO processors for establishing TFO mode for this call; a manual input device for directing a first mobile station to transmit a burst DTMF digit or multiple DTMF digits; an IS-95 reverse burst DTMF signaling message unit for sending an IS-95 reverse burst DTMF signaling message from the first mobile station to a first TFO processor; the first TFO processor extracting DTMF information from the DTMF signaling message received by the first TFO processor and forming a TFO frame containing this DTMF information; the TFO processor having an output for transmitting this TFO frame to a second TFO processor; the second TFO processor having means for sending a DTMF signaling acknowledgment message to the first TFO processor in another TFO frame; the second TFO processor also extracts the DTMF information from the TFO frame received from the first TFO processor and triggering the generation of an IS-95 forward burst DTMF signaling message; the second TFO processor having an output for transmitting the burst DTMF signaling message to the second mobile station; and means for generating DTMF tones based on the DTMF signaling message received by the second mobile station.

BRIEF DESCRIPTION OF THE DRAWING

FIG. 3 is a flow diagram of a process for sending bursts of DTMF tones from one mobile to another in TFO mode.

FIG. 4 is a flow diagram of a process for sending continuous DTMF tones from one mobile to another in TFO mode.

DETAILED DESCRIPTION

Figure 1:
FIG. 1 is a diagram of a known arrangement for mobile to mobile operation.
Figure 2:
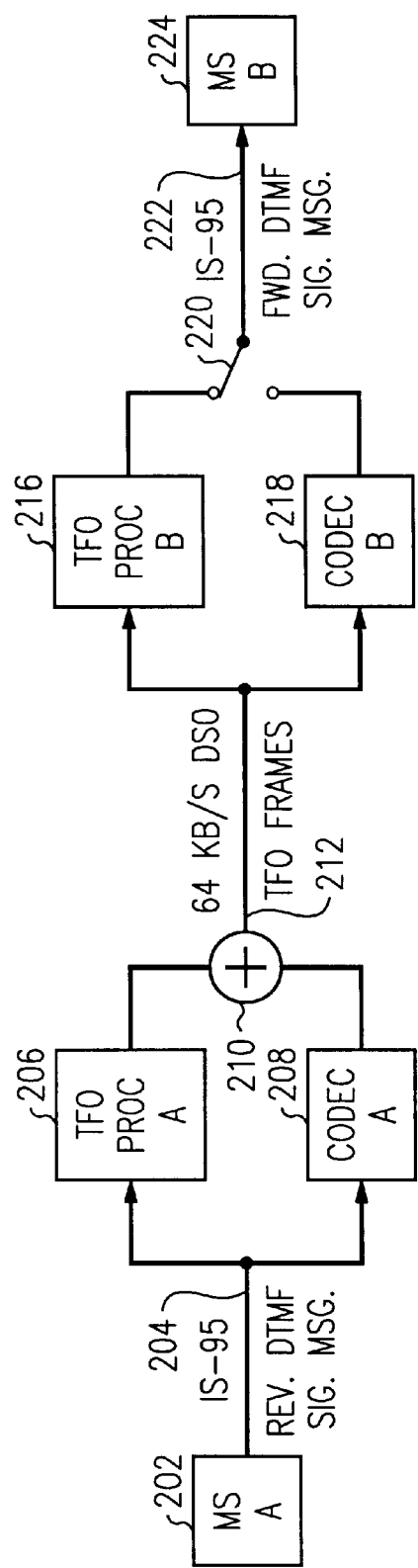
FIG. 2 is a diagram for an arrangement for mobile to mobile operation in accordance with the present invention.

Referring now to diagram FIG. 2, an embodiment of the invention will be described. Arrangement 200 is shown in FIG.2. Arrangement 200 has MS A 202, which is some type of digital protocol unit such as code division multiple access (CDMA). MS A 202 is connected to link 204 to TFO PROC A 206. MS A 202 is similarly connected by link 204 to CODEC A 208 for non-TFO operation, i.e. tandem operation. TFO PROC A 206 and CODEC A 208 are further connected to summing point 210. Summing point 210 is connected by central link 212 to TFO PROC B 216. Summing point 210 will forward the sum of the outputs from TFO PROC A 206 and CODEC A 208. Since usually only one of these two will output a signal at a time, this accomplishes the desired result. Similarly, summing point 210 is connected to CODEC B 218 for non-TFO operation, i.e. tandem operation. Controlled switch 220 is controlled by TFO PROC B 216. TFO PROC B 216 determines if the present operation is a TFO operation in which case it switches switch 220 to the output of TFO PROC B 216 or a non-TFO operation in which case it switches switch 220 to the output of CODEC B 218. The central wiper of switch 220 is connected via link 222 to MS B 224.

It should be noted that links 204 and 222 are simplified in order to focus primarily on the invention. The links 204 and 222 are wireless links at least in part. So part of link 204 is a wireless link for MA A 202. Similarly, part of link 222 is a wireless link to MS B 224. This is the configuration of arrangement 200, even though MS B 224 may be a network interface unit (NIU) acting as a type of hub for many connecting telecommunication units, such as fax machines, computers, answering machines, POTS phone sets, etc., because of the use of a mobile as an NIU, it is very important to ensure the reliable transmission of DTMF tones from one MS to another MS (NIU) in order to be able to use any of the NIU peripherals in a way that these peripherals were designed to be used and controlled.

For example, consider operating scenario 1 where control from a user at MS A 202 is effected by means of a burst DTMF. In scenario 1, a mobile-to-mobile call between MS A 202 and MS B 224 has been established in TFO mode according to the present invention for this call, as shown in FIGS. 2 and 3. The mobile user at MS A 202 directs MS A 202 to transmit a burst DTMF character, which may be a DTMF digit, or a DTMF control character. Alternatively, the user at MS A 202 may direct transmission of multiple DTMF characters. In response to the user direction, MS A 202 sends an IS-95 reverse burst DTMF signaling message defined by IS-95 (1999) to TFO PROC A 206. TFO PROC A 206 subsequently extracts DTMF information from the DTMF signaling message received and forms a TFO frame containing this DTMF information. The DTMF message information might span over multiple TFO frames (up to 7 TFO frames) due to the message length requirement in IS-95. This TFO frame is transmitted through summing point to TFO PROC B 216. TFO PROC B 216 then sends a DTMF signaling acknowledgment message to TFO PROC A 206 in another TFO frame. Also, TFO PROC B 216 extracts the DTMF information from the TFO frame received from TFO PROC A 206, and triggers the generation of an IS-95 forward burst DTMF signaling message, which is transmitted to MS B 224. MS B 224 generates DTMF tones based on the DTMF signaling message received. The resulting burst DTMF character can be heard by another user at a MS B 224 audio output, or can be used by itself or with subsequent DTMF bursts to control MS B 224 and/or attached peripherals such as answering machines, computers etc. All while in TFO mode without changing into the tandem operating mode because of the bypassing of CODEC A 208 and CODEC B 218 made possible by TFO PROC A 206 and TFO PROC B 216 according to one aspect of the present invention.

Scenario 2 is a second operating scenario in which control from a user at MS A 202 is effected by means of a continuous DTMF instead of a burst DTMF. Scenario 2 assumes a mobile-to-mobile call between MS A 202 and MS B 224 has been established in TFO mode according to the present invention for this call using the arrangement 200 shown in FIG. 2 and the method 400 shown in FIG. 4. The mobile user at MS A 202 directs MS A 202 to transmit a continuous tone. In response to the user's direction, MS A 202 sends an IS-95 (1999) reverse continuous DTMF signaling message to TFO PROC A 206. TFO PROC A 206 then extracts DTMF information from the DTMF signaling message received and forms a TFO frame containing this DTMF information. This TFO frame is transmitted to TFO PROC B 216. In response to this TFO frame TFO PROC B 216 sends a DTMF signaling acknowledgment message to TFO PROC A 206 in another TFO frame. Next, TFO PROC B 216 extracts the DTMF information from the TFO frame received from TFO PROC A 206 and triggers the generation of an IS-95 forward continuous DTMF signaling message, which is transmitted to MS B 224. MS B 224 generates DTMF tones based on the DTMF signaling message received. The resulting continuous DTMF character can be heard by another user at a MS B 224 audio output, or can be used by itself or with subsequent continuous DTMF characters to control MS B 224 or peripherals attached thereto. To stop the continuous DTMF character, the mobile user directs MS A 206 to stop transmitting the continuous DTMF tone. MS A 206 then sends an IS-95 reverse continuous DTMF signaling message to TFO PROC A 206 to stop the continuous DTMF tone. TFO PROC A 206 extracts DTMF information from the DTMF signaling message received and forms a TFO frame containing this DTMF information. This TFO frame is then transmitted to TFO PROC B 216. In response to the TFO frame from TFO PROC A 206, TFO PROC B 216 sends a DTMF signaling acknowledgment message to TFO PROC A 206 in an acknowledgement TFO frame. TFO PROC B 216 then extracts the DTMF information from the TFO frame received from TFO PROC A 206, and triggers the generation of an IS-95 forward continuous DTMF signaling message to stop the continuous DTMF tone. TFO PROC B 216 then transmits this message to MS B 224. In response to the stop continuous DTMF tone message from TFO PROC B 216, MS B 224 stops the generation of the DTMF tone. The result of the stopping of generation of the continuous DTMF character is that the other user at the MS B 224 audio output can no longer hear the DTMF tone, or the continuous DTMF characters stops in order to complete a control step of either MS B 224 or continuous DTMF controlled peripherals attached thereto.

By using either burst DTMF tone signaling or continuous DTMF signaling in TFO mode according to the present invention, mobile-to-mobile DTMF control operations can be accomplished without shifting into tandem operation, which inserts distortion and delay. This is especially important when one of the mobile units is a sophisticated device, such as an advanced mobile terminal, a mobile personal computer, a mobile personal digital assistant, or a fixed wireless NIU.

One embodiment of the present invention has a new general messaging packet type for sending in a TFO Frame. The new TFO frame packet added contains the following data fields to handle general messaging:

System identifier (8 bits, defined in existing TFO standards);
CODEC type (4 bits, defined in existing TFO standards);
Embedded TFO message indicator (1 bit, defined in existing TFO standards);
Packet type (a new value to be added to existing values in existing TFO standards);
Message type (New field; a value to be specified for DTMF signaling; another value to be specified for DTMF signaling acknowledgment; other values are reserved and could be used for future support mobile-to-mobile signaling in TFO mode);
Message length (New field added);
Message Body (New field added); and
CRC (New field added).

In addition to the new general messaging packet type defined immediately above, the encoding of the message body for DTMF signaling is as follows:

DTMF_SIG_TYPE (1 bit, New field; 0=burst signaling, 1=continuous signaling);
NUM_DIGITS (8 bits, defined in IS-95 standards, use 1 if continuous signaling);
DTMF_ON_LENGTH (3 bits, defined in IS-95 standards, not used if continuous signaling);
DTMF_OFF_LENGTH (3 bits, defined in IS-95 standards, not used if continuous signaling); and
DIGITi (4 bits, defined in IS-95 standards; repeated NUM_DIGITS times; use 1111 to stop continuous signaling).

The message body for DTMF signaling acknowledgment is as follows: DTMF_ACK (1 bit, New field; 0=successful; 1=unsuccessful).

If for any reason, a mobile-to-mobile TFO link cannot be used to send DTMF signaling, then the default mode for DTMF signaling is tandem mode DTMF signaling. Examples of such reasons are message protocol incompatibilities and equipment problems. Referring again to FIG. 2, tandem operation in a TFO mode capable arrangement 200 will be described. If during a TFO call a user at MS A 202 directs the sending of a DTMF tone, TFO PROC A 206 in response to the direction of MS A 202 sends a DTMF signaling message in a TFO Frame to TFO PROC B 216. TFO PROC A 206 determines that TFO PROC B 216 cannot handle DTMF signaling messages in TFO Frames if TFO PROC A 206 receives a DTMF signaling acknowledgment message in a TFO Frame from PROC B 216 that indicates that the operation was unsuccessful, or if no acknowledgment message is received within a specified amount of time, such as 40 ms. In case TFO PROC A 206 determines TFO PROC B 216 cannot handle DTMF tones for any reason, TFO PROC A 206 changes to tandem mode and the DTMF tone generator associated with CODEC A 208 immediately begins transmitting DTMF tones on a PCM channel to CODEC B 218, using all 8 bits per sample. To accomplish this, CODEC A 208 must either respond to an output of the timer and unsuccessful DTMF_ACK sensitive portions of TFO PROC A 206, or must duplicate the functional operation of the timer and unsuccessful DTMF_ACK sensitive portions of TFO PROC A 206. The first DTMF tone in tandem operation mode shall be transmitted for a specified minimum of time, such as 100 msec. A DTMF detector associated with CODEC B 218 detects the DTMF tone on the PCM channel and decodes the tones into DTMF characters and transmits the tones representing the DTMF characters to MS B 224. TFO PROC B 216 changes to tandem mode. To accomplish this change, TFO PROC B 216 must either be responsive to a tandem operation mode sensed output from CODEC B 218, or have circuitry duplicative of the functional operation of a tandem operation mode sensitive portions of CODEC B 218.

Thus, it will now be understood that there has been disclosed a heretofore unknown method and arrangement for sending DTMF tones between mobile stations while in TFO mode. While the invention has been particularly illustrated and described with reference to preferred embodiments thereof, it will be understood by those skilled in the art that narrows changes in form, details and applications may be made therein. It is accordingly intended that the appended claims shall cover all such changes in form, details and applications which do not depart from the true spirit and scope of the invention.

What is claimed is:

1. A method for sending a burst of DTMF (Dual Tone Multiple Frequency) tones from one mobile station to another mobile station while a call is in progress comprising the steps of:
    establishing TFO (Tandem Free Operation) mode for this call;
    directing a first mobile station to transmit a burst DTMF digit or multiple DTMF digits;
    sending an IS-95 reverse burst DTMF signaling message from the first mobile station to a first TFO processor;
    extracting DTMF information from the DTMF signaling message received by the first TFO processor and forming a TFO frame containing this DTMF information;

transmitting this TFO frame from the first TFO processor to a second TFO processor;

sending a DTMF signaling acknowledgment message from the second TFO processor to the first TFO processor in a TFO frame;

extracting the DTMF information from the TFO frame received from the first TFO processor by the second TFO processor and triggering the generation of an IS-95 forward burst DTMF signaling message;

transmitting this message to a second mobile station; and generating DTMF tones based on the DTMF signaling message received by the second mobile station.

2. The method of claim 1, wherein the DTMF message information might span over multiple TFO frames according to a message length requirement of IS-95.

3. The method of claim 2, further comprising the steps of:

sending a DTMF signaling message in a TFO Frame by PROC A to TFO PROC B;

TFO PROC A proceeding under the assumption that TFO PROC B cannot handle DTMF signaling messages in TFO Frames if either TFO PROC A receives a DTMF signaling acknowledgment message in a TFO Frame from PROC B indicating that the operation was unsuccessful, or TFO PROC A receives no acknowledgment message within a specified amount of time;

in response to TFO PROC B being unable to handle DTMF signaling messages in TFO frames, transmitting by a DTMF tones generator associated with CODEC A DTMF tones on a PCM channel;

changing TFO PROC A into tandem mode;

transmitting the first DTMF tone for a specified minimum amount of time;

detecting by a DTMF detector associated with CODEC B the DTMF tones on the PCM channel;

changing TFO PROC B into tandem operation mode; and decoding the DTMF tones into DTMF digits and transmitting the tones to MS B.

4. The method of claim 3, wherein said specified amount of time is 40 milliseconds and said specified minimum amount of time is 100 milliseconds.

5. The method of claim 3, wherein all 8 bits per sample are used for signaling the DTMF tones on the PCM channel.

6. The method of claim 1, wherein one of the mobile stations is a fixed mobile wireless station.

7. The method of claim 1, further comprising the steps of:

after sending a DTMF signaling message in a TFO Frame to TFO PROC B by TFO PROC A, determining by TFO PROC A that TFO PROC B cannot handle DTMF signaling messages in TFO Frames if either TFO PROC A receives a DTMF signaling acknowledgment message in a TFO Frame from PROC B that indicates that the operation was unsuccessful, or no acknowledgment message is received within a specified amount of time in response to the determination that TFO PROC B cannot handle DTMF signaling messages in TFO frames, immediately transmitting by a DTMF tone generator associated with CODEC A DTMF tones on the PCM channel, using all 8 bits per sample and changing TFO PROC A to tandem operation mode;

said DTMF on the PCM channel tones being transmitted for a specified minimum of time, initially;

the DTMF detector associated with CODEC B detects the DTMF tones on the PCM channel and decodes the tones into DTMF digits and transmits the tones to MS B; and changing TFO PROC B into tandem operation mode.

8. The method of claim 7, wherein said DTMF are transmitted for 40 milliseconds as said specified minimum of time.

9. The method of claim 1, wherein the DTMF signaling acknowledgement message has a 1 bit field in which 0 denotes successive communication and 1 denotes unsuccessful communication.

10. A method for sending a continuous DTMF signal between two mobile stations comprising the steps of:

establishing TFO mode for this call;

directing a first mobile station A to transmit a continuous DTMF tone;

sending an IS-95 reverse continuous DTMF signaling message from the first mobile station to a first TFO processor;

extracting DTMF information from the DTMF signaling message received by the first TFO processor and forming a TFO frame containing this DTMF information;

transmitting this TFO frame to a second TFO processor;

sending a DTMF signaling acknowledgment message from the second TFO processor to the first TFO processor in another TFO frame;

extracting the DTMF information from the TFO frame received from the first TFO processor by the second TFO processor;

triggering the generation of an IS-95 forward continuous DTMF signaling message;

transmitting this continuous DTMF signaling message to a second mobile station; and generating DTMF tones based on the DTMF signaling message received by the second mobile station.

11. The method of claim 10, further comprising the steps of:

directing the first mobile station to stop transmitting the continuous DTMF tone;

sending an IS-95 reverse continuous DTMF signaling message from the first mobile station to the first TFO processor to stop the continuous DTMF tone extracting by the first TFO processor DTMF information from the DTMF signaling message received from the first mobile station and forming a TFO frame containing this DTMF information;

transmitting this TFO frame to the second TFO processor;

sending a DTMF signaling acknowledgment message from the second TFO processor to the first TFO processor in another TFO frame;

extracting the DTMF information from the TFO frame received from the first TFO processor;

triggering the generation of an IS-95 forward continuous DTMF signaling message to stop the continuous DTMF tone by the second TFO processor;

transmitting the stop the continuous DTMF tone message from the second TFO processor to the second mobile station; and stopping the generation of the continuous DTMF tone by the second mobile station.

12. The method of claim 10, further comprising the steps of:

determining by the first TFO processor that the second TFO processor cannot handle a DTMF signaling message in a TFO frame after the first TFO processor sends the DTMF signaling message in the TFO Frame to the second TFO processor if either the first TFO processor receives a DTMF signaling acknowledgment message in a TFO frame from the second TFO processor indicating that the DTMF signaling message operation was unsuccessful, or no acknowledgment message is received within a previously specified amount of time; and transmitting DTMF tones on the PCM channel via the DTMF tone generator associated with a first CODEC upon a lack of a positive acknowledgement message;

changing the first TFO processor into tandem operation mode;

detecting by a DTMF detector associated with a second CODEC the DTMF tone on the PCM channel;

decoding the DTMF tone into a DTMF character;

transmitting the DTMF tone to the second mobile station; and changing the second TFO processor into tandem mode.

13. The method of claim 12, wherein the PCM channel signaling message is transmitted using 8 bits per sample.

14. The method of claim 13, wherein the first DTMF tone shall be transmitted for a specified minimum amount of time.

15. The method of claim 14, wherein said specified minimum is 100 milliseconds.

16. An apparatus for sending a burst of DTMF tones from one mobile station to another mobile station while a call is in progress comprising:

means for establishing TFO mode for this call;

means for directing a first mobile station to transmit a burst DTMF character;

means for sending an IS-95 reverse burst DTMF signaling message from the first mobile station a first TFO processor;

means for extracting DTMF information from the DTMF signaling message received by the first TFO processor and forming a TFO frame containing this DTMF information;

means for transmitting this TFO frame to a second TFO processor;

means for sending a DTMF signaling acknowledgment message from the second TFO processor to the first TFO processor in another TFO frame;

means for extracting the DTMF information from the TFO frame received from the first TFO processor step by the second TFO processor and triggering the generation of an IS-95 forward burst DTMF signaling message;

means for transmitting this burst DTMF signaling message to the second mobile station; and means for generating DTMF tones based on the DTMF signaling message received by the second mobile station.

17. An apparatus for sending a burst of DTMF tones from one mobile station to another mobile station while a call is in progress comprising:

a plurality of TFO processors for establishing TFO mode for this call;

user actuated device for directing a first mobile station of the plurality of TFO processors to transmit a burst DTMF character;

the first mobile station having an output for sending an IS-95 reverse burst DTMF signaling message to a first TFO processor;

the first TFO processor extracting DTMF information from the DTMF signaling message received by the first TFO processor and forming a TFO frame containing this DTMF information;

the first TFO processor having an output for transmitting this TFO frame to a second TFO processor of the plurality of TFO processors;

the second TFO processor having an acknowledgement output for sending a DTMF signaling acknowledgment message to the first TFO processor in another TFO frame;

the second TFO processor extracting the DTMF information from the TFO frame received from the first TFO processor step by the second TFO processor and triggering the generation of an IS-95 forward burst DTMF signaling message;

the second TFO processor having an output for transmitting this burst DTMF signaling message to the second mobile station; and the second mobile station having a DTMF tone generator for generating a DTMF tone based on the DTMF signaling message received by the second mobile station.

18. The apparatus of claim 17 wherein the user input device is a multicharacter keypad having at least twelve characters including alpha-numeric characters and control characters.

19. The apparatus of claim 17 wherein the user input device is a speech recognition system.

20. The apparatus of claim 17 wherein said another TFO frame has a DTMF signaling acknowledgment of one bit with logic 0 denoting successful message receipt and logic 1 denotes unsuccessful message receipt.

* * * * *